US009874670B2

(12) United States Patent
Kim et al.

(10) Patent No.: US 9,874,670 B2
(45) Date of Patent: Jan. 23, 2018

(54) OPTICAL COMPENSATION FILM, METHOD OF MANUFACTURING THE SAME, AND LIQUID CRYSTAL DISPLAY PROVIDED WITH THE SAME

(75) Inventors: Hee-Kyung Kim, Seongnam-si (KR); Myung-Sup Jung, Seongnam-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 808 days.

(21) Appl. No.: 13/022,130

(22) Filed: Feb. 7, 2011

(65) Prior Publication Data

US 2011/0317114 A1   Dec. 29, 2011

(30) Foreign Application Priority Data

Jun. 24, 2010   (KR) .................... 10-2010-0060235

(51) Int. Cl.
  *G02F 1/13363*  (2006.01)
  *G02B 5/30*  (2006.01)

(52) U.S. Cl.
  CPC ..... *G02B 5/3083* (2013.01); *G02F 1/133632* (2013.01); *G02F 2001/133633* (2013.01); *G02F 2413/105* (2013.01)

(58) Field of Classification Search
  CPC ......... G02F 1/133636; G02F 1/133632; G02B 5/3083
  (Continued)

(56) References Cited

U.S. PATENT DOCUMENTS 5,619,352 A * 4/1997 Koch et al. ............... 349/89
5,719,653 A * 2/1998 Minato ............... G02F 1/1416
                                                  349/126

(Continued)

FOREIGN PATENT DOCUMENTS

JP    06-250166   *  9/1994   ........... G02F 1/1335
JP    06250166        9/1994

(Continued)

OTHER PUBLICATIONS

Korean Office Action Dated Feb. 27, 2017 in KR Patent Application No. 10-2010-0060235.

*Primary Examiner* — Nathanael R Briggs
*Assistant Examiner* — Anthony G Quash
(74) *Attorney, Agent, or Firm* — Cantor Colburn LLP

(57) ABSTRACT

Disclosed is an optical compensation film including a supporter, and an optical compensation layer disposed on at least one surface of the supporter and including a polymer of cholesteric liquid crystal molecules having a structure in which a plurality of parallel-arranged liquid crystal molecules are helically arranged, wherein the cholesteric liquid crystal layer has a helical axis that is bent and tilted to the supporter at an angle represented by the following Equation 1; a method of manufacturing the same; and a liquid crystal device (LCD) including the optical compensation film.

$$H=(\theta_T-\theta_B)*(d''/d)^\gamma+\theta_B \qquad [\text{Equation 1}]$$

In Equation 1, H is a tilt angle of the helical axis of a layer of the cholesteric liquid crystal molecules; $\theta_B$ is a tilt angle of liquid crystal molecule contact with the supporter; $\theta_T$ is a tilt angle of a liquid crystal molecule disposed at a part of the layer furthest from the supporter; d is a thickness of the layer; d' is a distance from the supporter along a vertical direction; γ is a degree of variation in tilt angle of helical axis; and γ≥0.01.

10 Claims, 16 Drawing Sheets

(58) Field of Classification Search
USPC .......................................................... 349/121
See application file for complete search history.

(56) References Cited

U.S. PATENT DOCUMENTS

| | | | |
|---|---|---|---|
| 5,864,376 A * | 1/1999 | Takatori | 349/128 |
| 6,630,974 B2 | 10/2003 | Galabova et al. | |
| 7,719,643 B2 | 5/2010 | Kashima et al. | |
| 7,777,836 B2 | 8/2010 | Shiraogawa et al. | |
| 7,859,622 B2 | 12/2010 | Kashima et al. | |
| 8,287,756 B2 | 10/2012 | Verrall et al. | |
| 8,599,339 B2 * | 12/2013 | Lee | G02F 1/133632 349/117 |
| 2003/0193637 A1 * | 10/2003 | Mi et al. | 349/123 |
| 2007/0258024 A1 | 11/2007 | Parri et al. | |
| 2008/0088649 A1 * | 4/2008 | Ikeno et al. | 345/690 |
| 2008/0113111 A1 * | 5/2008 | Verrall et al. | 428/1.1 |
| 2008/0297676 A1 * | 12/2008 | Kimura | 349/39 |
| 2009/0122243 A1 * | 5/2009 | Sugiyama et al. | 349/118 |
| 2010/0093096 A1 * | 4/2010 | Acharya | B82Y 30/00 436/4 |

FOREIGN PATENT DOCUMENTS

| | | | | |
|---|---|---|---|---|
| JP | 08-209127 | * | 8/1996 | ............ C09K 19/02 |
| JP | 08209127 | | 8/1996 | |
| KR | 1020010093211 | | 10/2001 | |
| KR | 1020040066159 | | 7/2004 | |
| KR | 1020070039558 | | 4/2007 | |
| KR | 1020080039966 A | | 6/2010 | |
| KR | 1020060039909 A | | 12/2011 | |
| KR | 1020070041528 A | | 2/2013 | |

* cited by examiner

OPTICAL COMPENSATION FILM, METHOD OF MANUFACTURING THE SAME, AND LIQUID CRYSTAL DISPLAY PROVIDED WITH THE SAME

CROSS-REFERENCE TO RELATED APPLICATION

This application claims priority to Korean Patent Application No. 10-2010-0060235, filed on Jun. 24, 2010, and all the benefits accruing therefrom under 35 U.S.C. §119, the content of which in its entirety is herein incorporated by reference.

BACKGROUND

1. Field

This disclosure relates to an optical compensation film and a method of manufacturing the same, and a liquid crystal display ("LCD") provided with the optical compensation film.

2. Description of the Related Art

A liquid crystal display ("LCD") is one type of flat panel display that is currently being widely used. The LCD includes two display substrates, each typically provided with an electric-field generating electrode, and a liquid crystal layer interposed therebetween. In the typical LCD, liquid crystal molecules are rotated depending upon an electric field disposed between the field generating electrodes to thereby vary light transmittance therethrough to display an image.

The LCD panel has a low contrast ratio as viewed from the side direction, so the viewing angle is relatively narrow which deteriorates side visibility of the display. In order to improve the side visibility, an optical compensation film may be provided on an outside of the LCD panel.

However, when using the optical compensation film, the compensation is typically insufficient to improve the viewing angle when the display is in the black state.

SUMMARY

One aspect of the present disclosure provides an optical compensation film capable of improving the viewing angle of a liquid crystal display ("LCD") device.

Another aspect of the present disclosure provides a method of manufacturing the optical compensation film.

A further aspect of the present disclosure provides an LCD including the optical compensation film.

According to one aspect, an embodiment of an optical compensation film is provided that includes a supporter and an optical compensation layer disposed on at least one surface of the supporter and including a polymer of a cholesteric liquid crystal molecules having a helical structure, wherein a helical axis of the cholesteric liquid crystal molecules is bent and tilted with respect to the supporter at an angle represented by the following Equation 1:

$$H=(\theta_T-\theta_B)*(d'/d)^\gamma+\theta_B \quad \text{[Equation 1]}$$

wherein, in Equation 1, H is a tilt angle of the helical axis of a layer of the cholesteric liquid crystal molecules; $\theta_B$ is a tilt angle of a cholesteric liquid crystal molecule in contact with the supporter; $\theta_T$ is a tilt angle of a cholesteric liquid crystal molecule disposed at a part of the layer furthest from the supporter; d is a thickness of the layer; d' is a distance from the supporter along the vertical direction; γ is a degree of variation in tilt angle of the helical axis; and γ≥0.01.

In one embodiment, γ may be bounded as 0.01≤γ≤100.
In one embodiment, $\theta_T$ may be about 80 degrees or less.
In one embodiment, $\theta_B$ may be about 120 degree or less.
In one embodiment, the optical compensation film may further include an alignment layer disposed between the supporter and the optical compensation layer.

According to another aspect of the present disclosure, an embodiment of a method of manufacturing the optical compensation film is provided that includes; preparing a cholesteric liquid crystal solution including a cholesteric liquid crystal monomer and a chiral dopant; applying the cholesteric liquid crystal solution to a supporter; providing a cholesteric liquid crystal layer having a helical structure with a helical axis bent and tilted with respect to the supporter; and photopolymerizing the tilted cholesteric liquid crystal monomer of the cholesteric liquid crystal layer to provide an optical compensation layer including a polymer of cholesteric liquid crystal molecules.

In one embodiment, the providing of a cholesteric liquid crystal layer having a helical structure may include irradiating polarized light onto at least a portion of a layer of the applied cholesteric liquid crystal solution to provide a gradient in tilt angle depending upon an amount of light absorbed thereby.

In one embodiment, the polarized light may be irradiated to the entire region where the cholesteric liquid crystal layer is applied.

In one embodiment, the providing of a cholesteric liquid crystal layer having a helical structure may be performed in a way that the cholesteric liquid crystal layer having a helical structure with a helical axis bent and tilted with respect to the supporter at an angle represented by the Equation 1.

In one embodiment, the manufacturing method may further include providing an alignment layer on the supporter and at least one of rubbing and photo-aligning the alignment layer before applying the cholesteric liquid crystal solution on the supporter.

In one embodiment, the chiral dopant may be included at about 0.01 wt % to about 90 wt % based on the total amount of the cholesteric liquid crystal solution.

In one embodiment, the manufacturing method may further include adding a photo-isomerizing material into the cholesteric liquid crystal solution before photo-polymerizing the cholesteric liquid crystal monomers of the cholesteric liquid crystal layer.

In one embodiment, the photo-isomerizing material may be selected from the group consisting of methyl orange, a compound having an azo group, and a combination thereof.

In one embodiment, the manufacturing method may further include adding at least one of an ultra-violet absorbing monomer and a polymer thereof into the cholesteric liquid crystal solution before photo-polymerizing the cholesteric liquid crystal monomers of the cholesteric liquid crystal layer.

In one embodiment, the providing a cholesteric liquid crystal layer having a helical structure may include moving a position where force is applied while applying force in at least one direction to at least a portion of the cholesteric liquid crystal layer on the supporter.

According to another aspect of the present disclosure, an LCD is provided that includes; an LCD panel including a first display panel, a second display panel, and a liquid crystal layer interposed between the first display panel and the second display panel; and an optical compensation film mounted on at least one surface of the liquid crystal display panel, wherein the optical compensation film includes a supporter and an optical compensation layer disposed on at least one surface of the supporter which including a polymer of cholesteric liquid crystal molecules having a helical structure, wherein a helical axis of the cholesteric liquid crystal molecules is tilted and bent with respect to the supporter at an angle represented by Equation 1.

In one embodiment, the γ may be bounded as 0.01≤γ≤100.

In one embodiment, the $\theta_T$ may be about 80 degrees or less.

In one embodiment, the $\theta_B$ may be about 120 degree or less.

In one embodiment, the liquid crystal display panel may be a twisted nematic ("TN") mode liquid crystal display panel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, advantages and features of this disclosure will become more apparent by describing in further detail exemplary embodiments thereof with reference to the accompanying drawings, in which.

DETAILED DESCRIPTION

Figure 1:
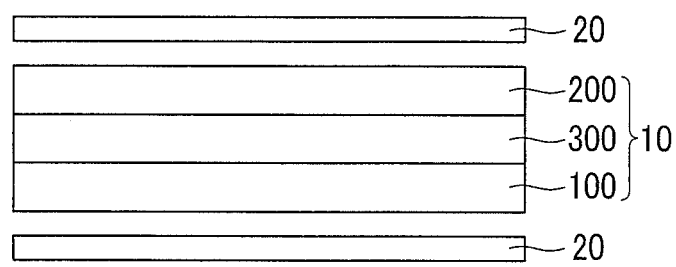
FIG. 1 is a cross-sectional view showing an exemplary embodiment of a liquid crystal display ("LCD") according to the present disclosure.

Embodiments now will be described more fully hereinafter with reference to the accompanying drawings, in which embodiments are shown. These embodiments may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the disclosure.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the embodiments will be described in detail with reference to the accompanying drawings.

Hereinafter, an embodiment of a liquid crystal display ("LCD") according to the present disclosure is described in detail referring to FIG. 1.

FIG. 1 is a cross-sectional view showing one embodiment of an LCD according to the present disclosure.

Referring to FIG. 1, the LCD includes an LCD panel 10 and an optical compensation film 20 disposed on the lower part and the upper part of the panel 10.

In one embodiment, the LCD panel 10 may be a twist nematic ("TN") mode panel.

The LCD panel 10 includes a first display panel 100, a second display panel 200, and a liquid crystal layer 300 interposed between the first display panel 100 and the second display panel 200.

In one embodiment, the first display panel 100 may include, for example, a thin film transistor ("TFT") (not shown) formed on a substrate (not shown) and a first field-generating electrode (not shown) connected thereto. The second display panel 200 may include, for example, a color filter (not shown) formed on the substrate and a second field-generating electrode (not shown).

The liquid crystal layer 300 may include a plurality of liquid crystal molecules. In one embodiment, the liquid crystal molecules may have positive dielectric anisotropy. The long axis thereof may be aligned substantially parallel to the surface of the first display panel 100 and substantially perpendicular to the surface of the second display panel 200 when not applying an electric field thereto, and may be aligned substantially perpendicular to the surface of the first display panel 100 and the second display panel 200 when applying an electric field thereto.

The optical compensation film 20 is disposed on an outside of the LCD panel 10. Although it is shown to be disposed in the upper part and lower part of the LCD panel 10 in the drawing, alternative embodiments may include configurations where it may be formed in either the upper part or the lower part of LCD panel 10 or two pieces of optical compensation film 20 may be formed in both the upper part and the lower part of LCD panel 10.

The optical compensation film 20 is described with reference to FIG. 2.

Figure 2:
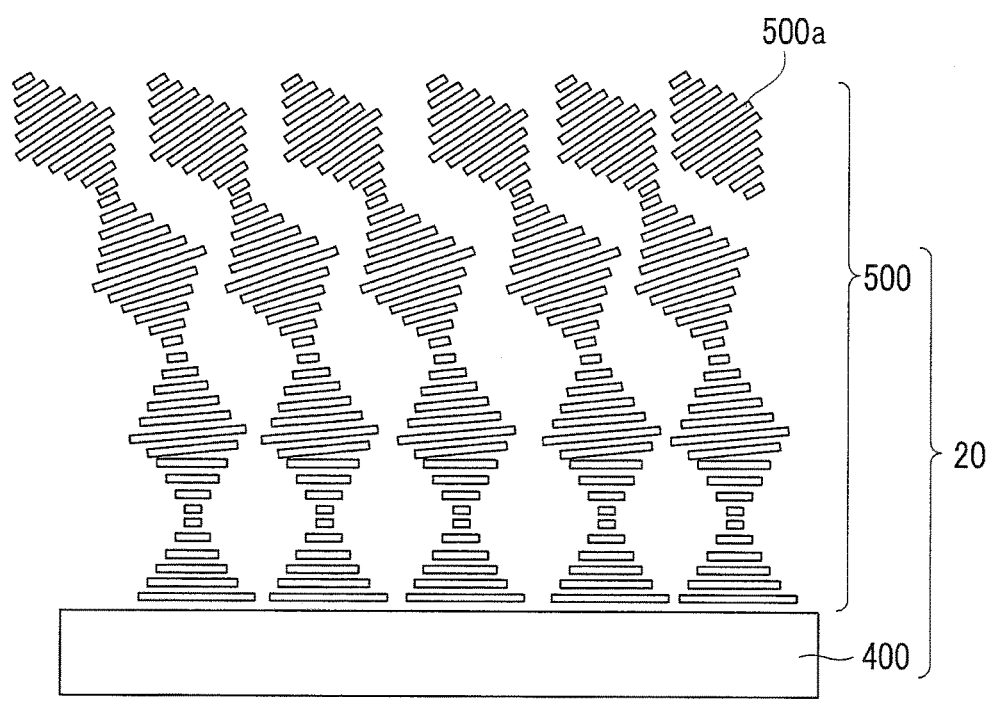
FIG. 2 is a schematic diagram showing an embodiment of an optical compensation film according to the present disclosure.
Figure 3A:
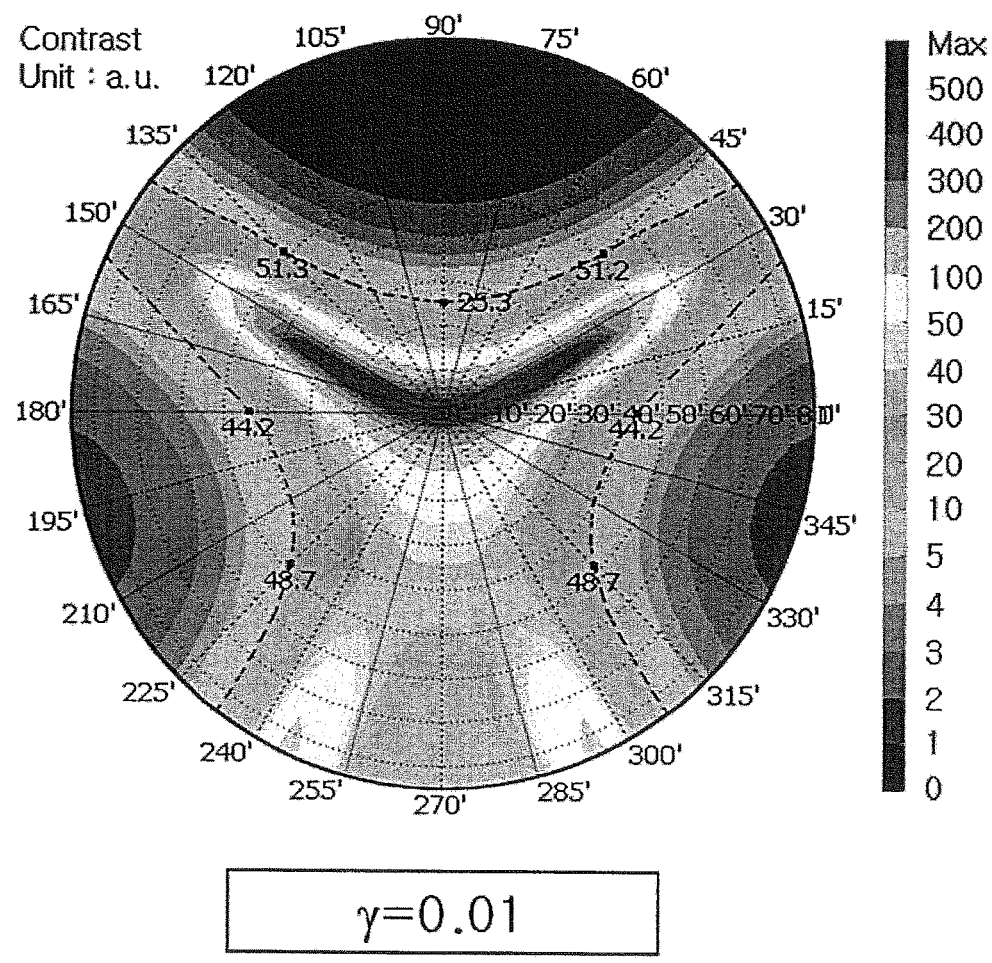
FIG. 3A to FIG. 3E, and FIG. 4 to FIG. 7 are graphs showing a relationship of the viewing angle with a tilt angle ($\theta_B$) of liquid crystal molecule contact with a supporter, a tilt angle ($\theta_T$) of liquid crystal molecules disposed at the outermost part in contact with air, and a gamma (γ) value of a parameter showing the degree of variation in tilt angle of a helical axis of the liquid crystal molecules.
Figure 3B:
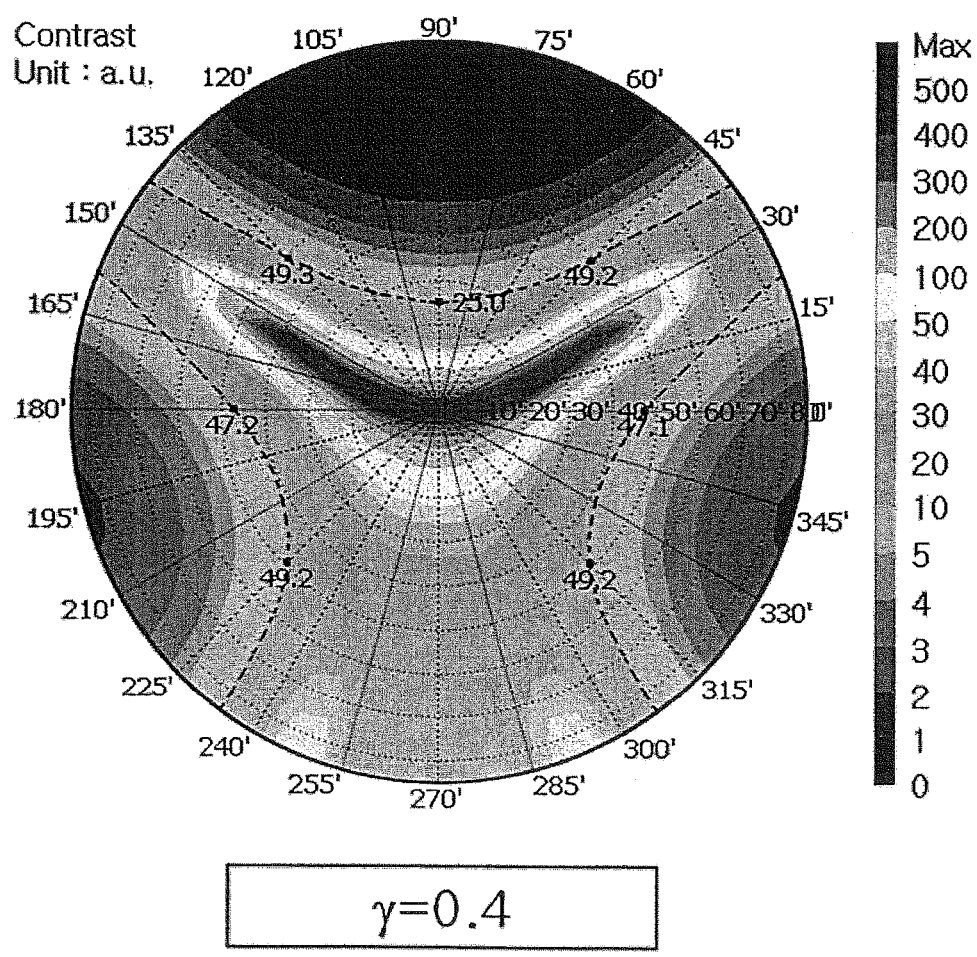
Figure 3C:
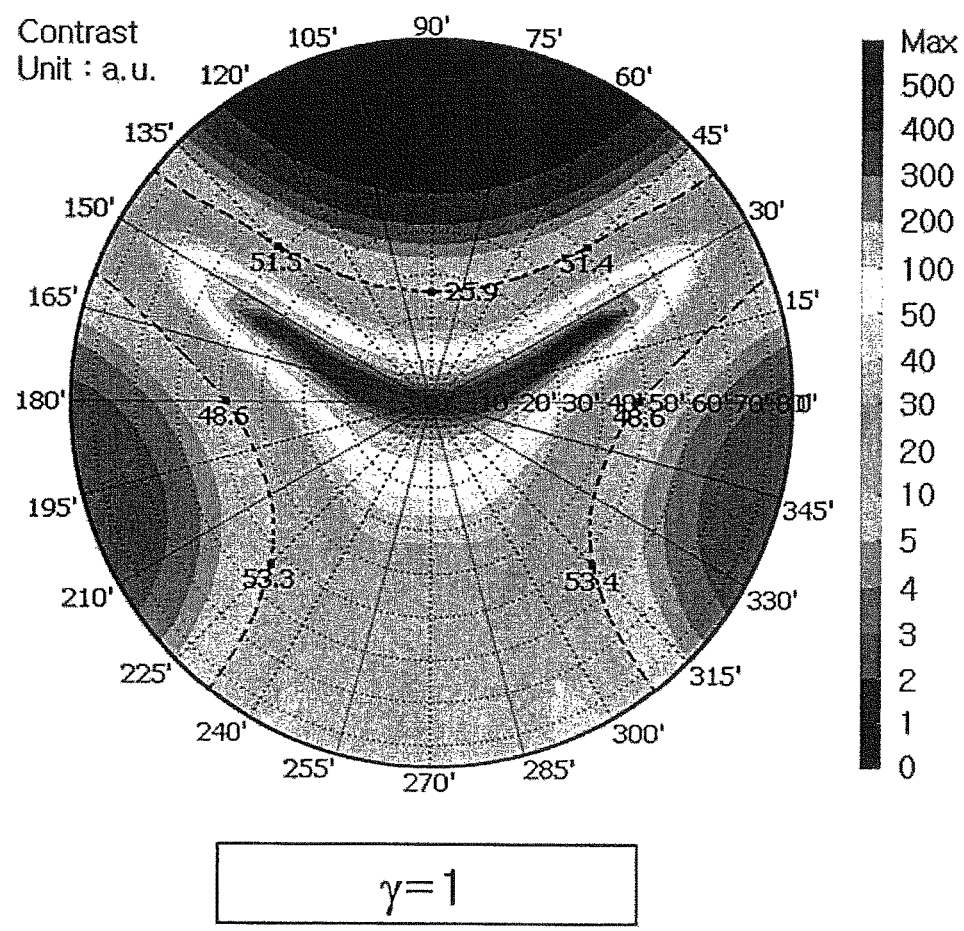
Figure 3D:
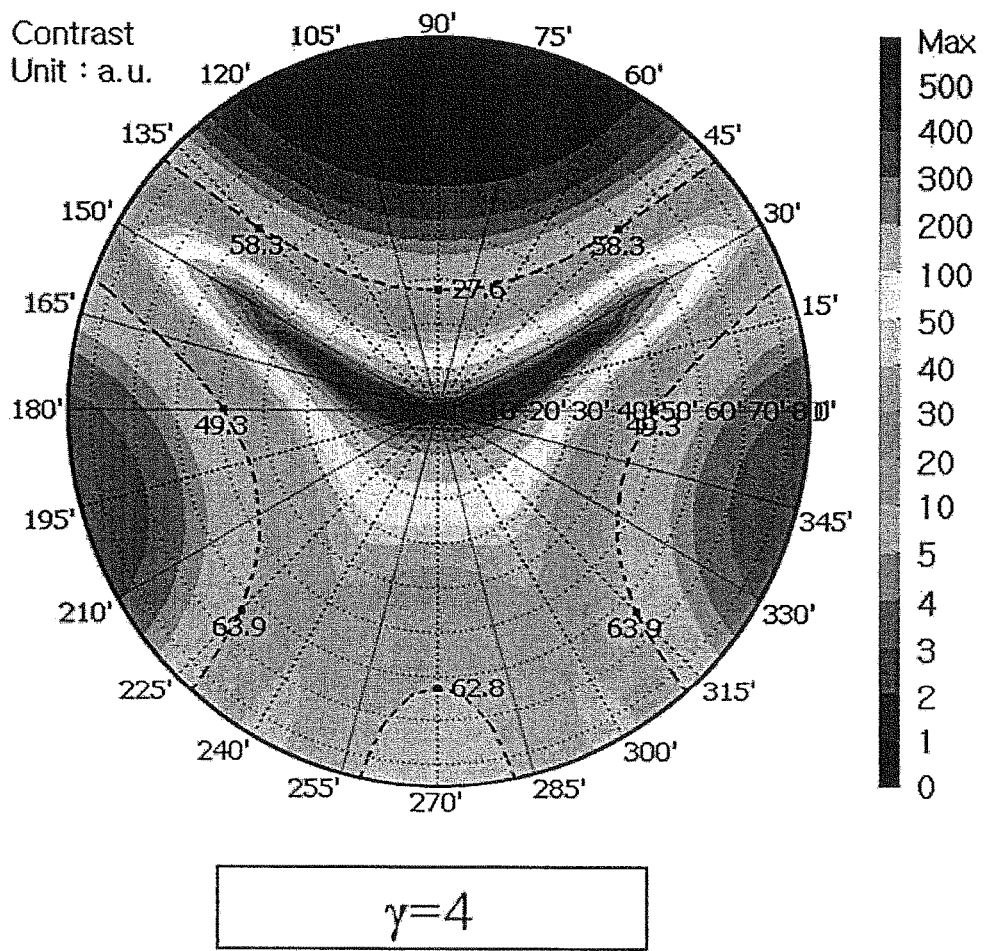
Figure 3E:
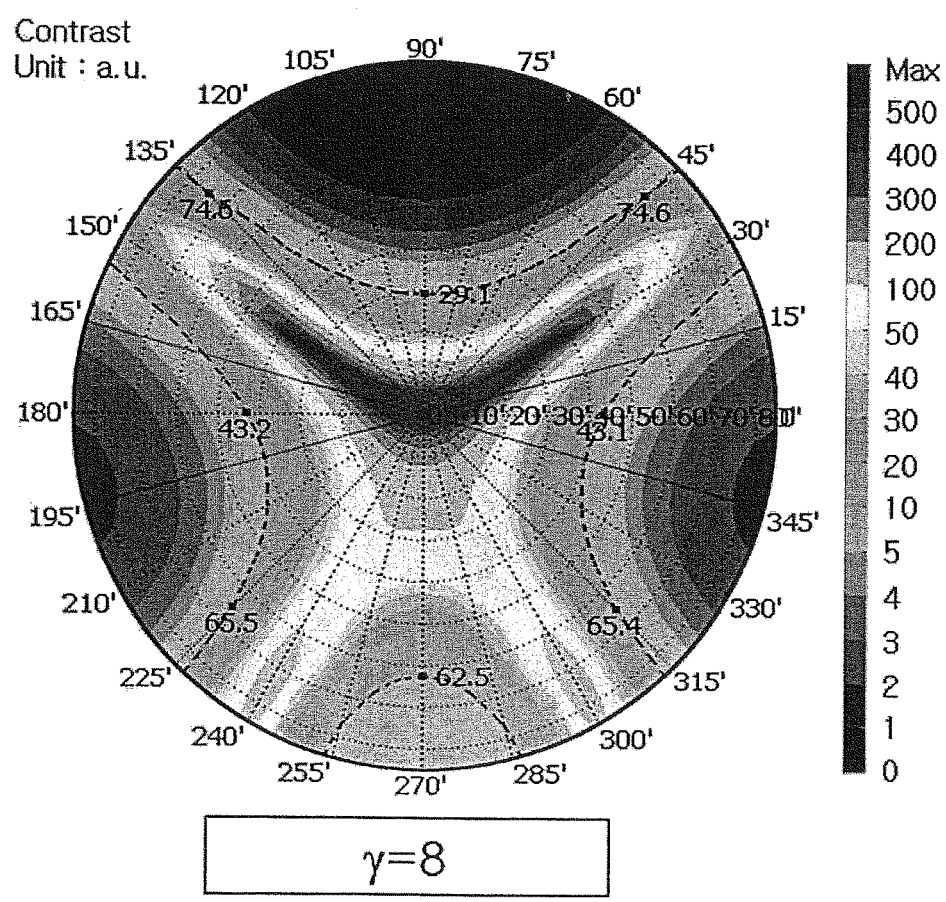

FIG. 2 is a schematic diagram showing an embodiment of an optical compensation film according to the present disclosure.

As shown in FIG. 2, the optical compensation film 20 includes a supporter 400 and an optical compensation layer 500 disposed on one surface of the supporter 400.

In one embodiment, the supporter 400 may be a polymer substrate made of a material such as triacetyl cellulose ("TAC"), polyethylene terephthalate ("PET"), or a cycloolefin polymer ("COP"), and may be stretched in one direction or two directions.

The optical compensation layer 500 includes a polymer of cholesteric liquid crystal molecules having a helical structure in which a plurality of parallel-arranged liquid crystal molecules 500a having a helical structure whose the helical axis is bent and tilted with respect to the supporter 400.

The cholesteric liquid crystal molecules have a stacking structure in which a plurality of layers are arranged, and liquid crystal molecules arranged in each layer are arranged in one predetermined direction. The cholesteric liquid crystal molecules are arranged in a helical structure in which the arranged direction is gradually changed with respect to the adjacent layer, and the helical structure has a helical axis that is bent and tilted with respect to the supporter 400 at a predetermined angle.

The helical structure is a similarly-arranged structure to that of the liquid crystal arrangement of the liquid crystal layer 300 in a TN mode LCD. For example, the liquid crystal molecules are arranged to be parallel in a horizontal direction when not applying a voltage to the TN mode LCD, and the liquid crystal molecules are substantially perpendicularly arranged to the substrate when applying a predetermined voltage to the LCD. However, since the liquid crystal molecules adjacent to the substrate are substantially parallel to the substrate due to an anchoring energy, the liquid crystal layer 300 has a hybrid-arranged state in which the tilt angle is gradually changed with increasing distance from the substrate.

The cholesteric liquid crystal molecules for the optical compensation layer 500 also has a similar tilted helical structure to the hybrid-arranged state in which the liquid crystal molecules are arranged in the liquid crystal layer 300, so it may have the same transmittance as viewed from the front direction in the black state of the TN mode LCD as viewed from the side direction in the black state of the TN mode.

The tilted helical structure of cholesteric liquid crystal may be accomplished by controlling the tilt angle variation of the helical axis of the cholesteric liquid crystal.

The cholesteric liquid crystal may have a helical axis bent and tilted with respect to the supporter 400 at an angle represented by the following Equation 1.

$$H=(\theta_T-\theta_B)*(d'/d)^\gamma+\theta_B \qquad \text{[Equation 1]}$$

In Equation 1, H is a tilt angle of the helical axis of a layer of the cholesteric liquid crystal molecules; $\theta_B$ is a tilt angle of a cholesteric liquid crystal molecule 500a in contact with the supporter 400; $\theta_T$ is a tilt angle of a cholesteric liquid crystal molecule 500a disposed at a part of the layer furthest from the supporter; d is a thickness of the optical compensation layer 500; d' is a distance from the supporter in a vertical direction; and a parameter ($\gamma$) showing the degree of variation in tilt angle of helical axis of the liquid crystal molecules 500a, wherein $\gamma \geq 0.01$.

According to Equation 1, the tilting degree of the helical axis of cholesteric liquid crystal may be controlled by adjusting the thickness of the optical compensation layer 500 and the composition ratio of cholesteric liquid crystal to nematic liquid crystal in the entire liquid crystal molecules 500a.

In Equation 1, the tilt angle ($\theta_B$) of liquid crystal molecule in contact with the supporter 400 may be controlled by the pretilt angle of the liquid crystal molecules set by the alignment layer (not shown) formed on the supporter 400. For example, the tilt angle ($\theta_B$) of liquid crystal molecule in contact with the supporter 400 may be around 5 degrees when a polyimide alignment layer is coated on the supporter and rubbed.

In Equation 1, the tilt angle ($\theta_T$) of the liquid crystal molecules 500a disposed at the part of the optical compensation layer furthest from the supporter, e.g., the part in contact with the air, may be controlled by supplying a polarized light to the liquid crystal molecules 500a, by adding a photo sensitive additive for tilting the liquid crystal molecules 500a in a predetermined direction, by applying a mechanical force above the optical compensation layer 500 to tilt the liquid crystal molecules 500a positioned at the outermost part or a combination of the above.

In Equation 1, γ is a parameter showing the degree of variation in tilt angle of the helical axis of the liquid crystal molecules in the entire cholesteric liquid crystal layer, and may be controlled by incident angle, degree of polarization, intensity of light irradiation, or other similar techniques.

Each of the variables relating to the liquid crystal molecules 500a, i.e., the tilt angle ($\theta_B$) of liquid crystal molecule contact with the supporter 400, the tilt angle ($\theta_T$) of liquid crystal molecules 500a disposed at the outermost part in contact with the air, and the gamma (γ) value showing the degree of variation in tilt angle of helical axis of the liquid crystal molecules 500a, affects the viewing angle.

FIG. 3A to FIG. 3E, and FIG. 4 to FIG. 7 are graphs showing the relationships of the viewing angle with the tilt angle ($\theta_B$) of liquid crystal molecule in contact with the supporter, the tilt angle ($\theta_T$) of liquid crystal molecules disposed at the part of the optical compensation layer furthest from the supporter, e.g., the part in contact with the air, and the gamma (γ) value showing the degree of variation in tilt angle of helical axis of the liquid crystal molecules.

First, referring to FIG. 3A to FIG. 3E, the left and right viewing angles and the up and down viewing angles are changed depending upon changing the gamma (γ) value to 0.01, 0.4, 1, 4, and 8.

FIG. 4 to FIG. 7 show contour plots of the relationships of the viewing angle with the tilt angle ($\theta_B$) of liquid crystal molecule in contact with the supporter, the tilt angle ($\theta_T$) of liquid crystal molecule disposed at the outermost part in contact with the air, and the gamma (γ) value showing the degree of variation in tilt angle of helical axis of liquid crystal molecules after matrixization of simulated viewing angle values according to a correlation analysis method.

Figure 4:
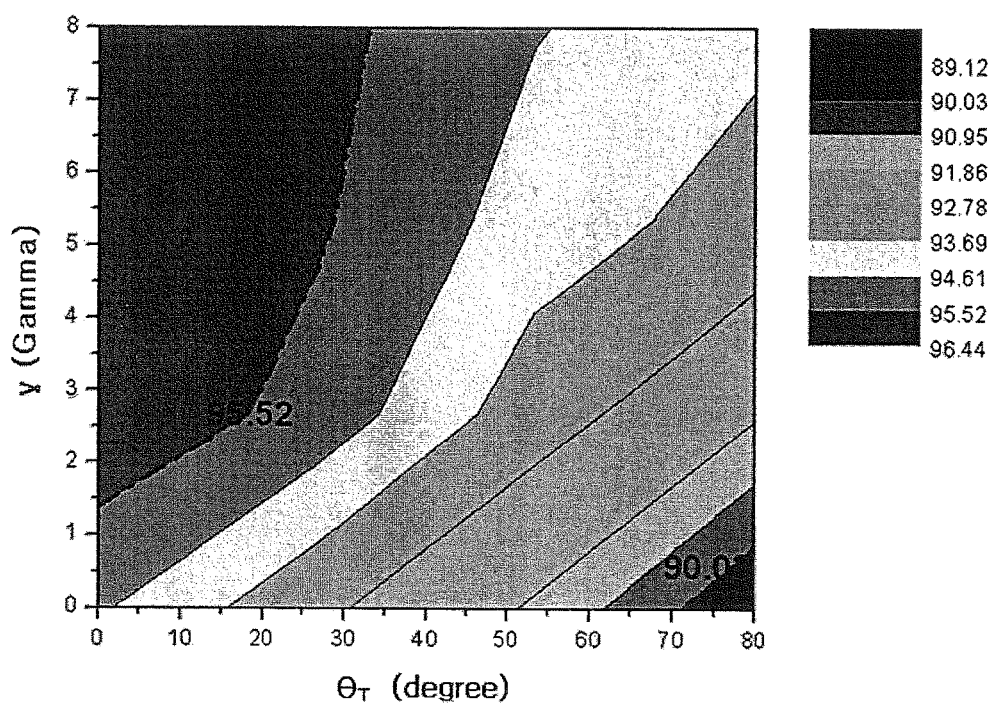

FIG. 4 shows the relationships between the tilt angle ($\theta_T$) of liquid crystal molecules disposed at the outermost part in contact with the air, and the gamma (γ) value and the viewing angle in the left and right directions. A desirable left and right viewing angle may be provided by adjusting the tilt angle ($\theta_T$) of the liquid crystal molecules disposed at the outermost part in contact with the air and the gamma (γ) value.

For example, in an embodiment wherein the tilt angle ($\theta_T$) of liquid crystal molecule disposed at the outermost part is about 80 degrees or less and the gamma (γ) value is about 0.01 or more, it may provide a left and right viewing angle of about 90 degrees or higher. Furthermore, in an embodiment wherein the tilt angle ($\theta_T$) of the liquid crystal molecules disposed at the outermost part is about 30 degrees or less and the gamma (γ) value is about 5.5 or more, or when the tilt angle ($\theta_T$) of the liquid crystal molecules disposed at the outermost part is about 20 degrees or less and the gamma (γ) value is about 2.5 or more, a left and right viewing angle of about 95 degrees or higher may be provided.

Figure 5:
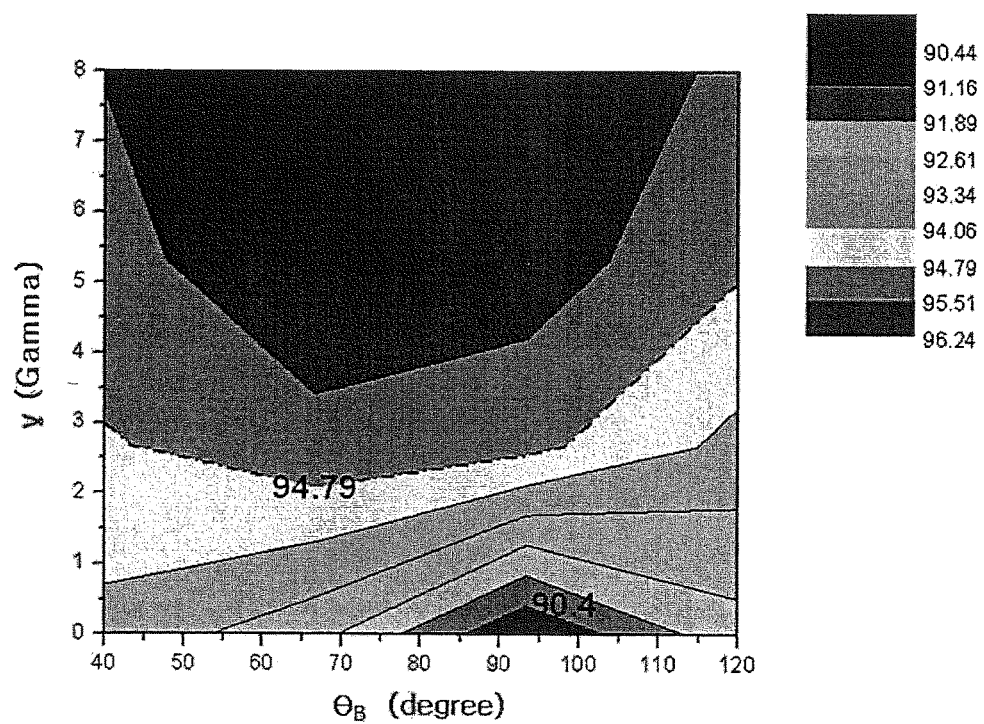

Referring to FIG. 5, the tilt angle ($\theta_B$) of the liquid crystal molecule in contact with the supporter and the gamma (γ) value have a relationship with the viewing angle in a left and right direction, and a desirable left and right viewing angle may be provided by adjusting the tilt angle ($\theta_B$) of liquid crystal molecule in contact with the supporter and the gamma (γ) value.

For example, when the tilt angle ($\theta_B$) of the liquid crystal molecule in contact with the supporter is about 120 degree or less and the gamma (γ) value is about 0.01 or more, a left and right viewing angle of about 90 degrees or higher may be provided. Furthermore, in an embodiment wherein the tilt angle ($\theta_B$) of the liquid crystal molecule in contact with the supporter is about 120 degrees or less and the gamma (γ) value is about 5 or more, a left and right viewing angle of about 95 degrees or higher may be provided, and in an embodiment wherein the tilt angle ($\theta_B$) of the liquid crystal molecule contact with the supporter is about 100 degrees or less and the gamma (γ) value is about 3 or more, a left and right viewing angle of about 94 degrees or higher may be provided.

Figure 6:
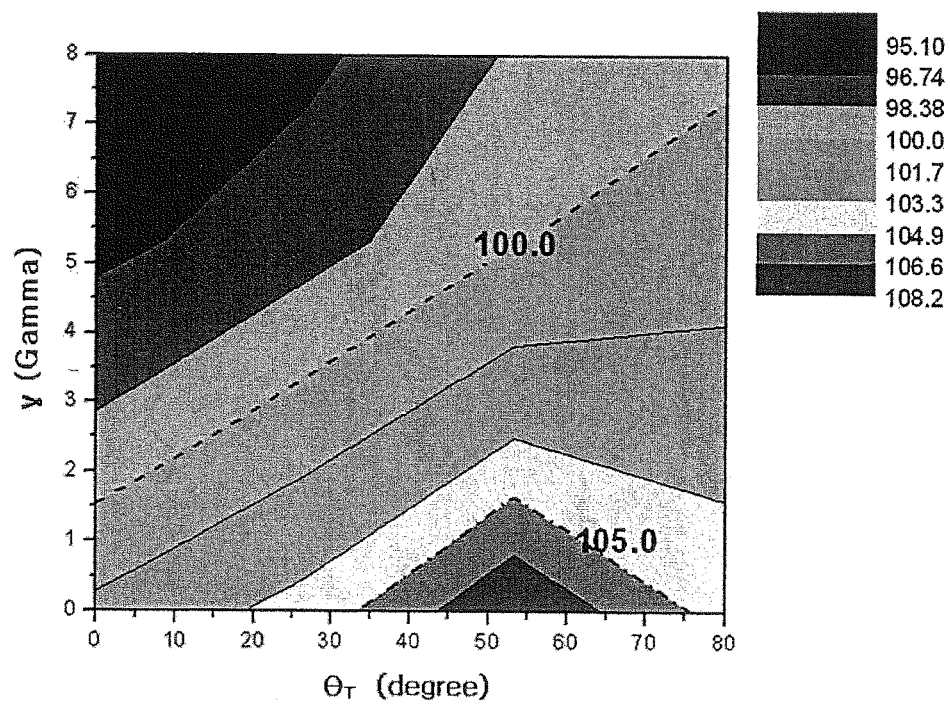

Referring to FIG. 6, the tilt angle ($\theta_T$) of the liquid crystal molecules disposed at the outermost part in contact with the air and the gamma (γ) value have a relationship with the viewing angle in the up and down directions. A desirable up and down viewing angle may be provided by adjusting the tilt angle ($\theta_T$) of the liquid crystal molecules disposed at the outermost part in contact with the air and the gamma (γ) value.

For example, when the tilt angle ($\theta_T$) of the liquid crystal molecule disposed at the outermost part in contact with the air is about 80 degrees or less and the gamma (γ) value is about 0.01 or more, an up and down viewing angle of about 95 degrees or higher may be provided. Furthermore, when tilt angle ($\theta_T$) of the liquid crystal molecule disposed at the outermost part in contact with the air is about 40 degrees or more and the gamma (γ) value is about 4 or less, an up and down viewing angle of about 100 degree or higher may be provided.

Figure 7:
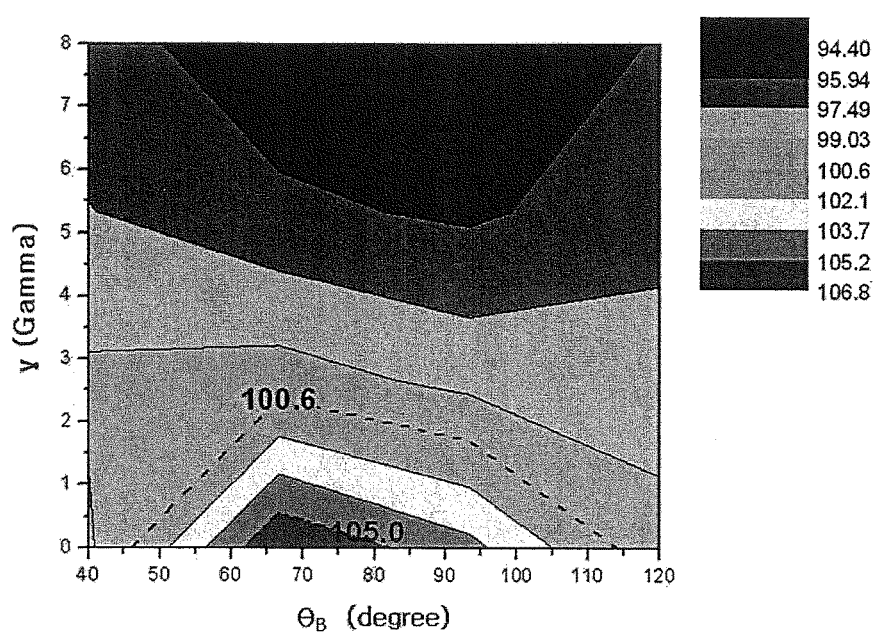

Referring to FIG. 7, the viewing angle in the upper and lower directions has a relationship with the angle ($\theta_B$) of the tilted liquid crystal molecule in contact with the supporter and the gamma (γ) value, and the desirable viewing angle in the up and down direction is established by adjusting the tilt angle ($\theta_B$) of the liquid crystal molecule contact with the supporter and the gamma (γ) value.

For example, when the tilt angle ($\theta_B$) of the liquid crystal molecule in contact with the supporter is about 120 degrees or less and the gamma (γ) value is about 0.01 or more, an upper and lower viewing angle of about 94 degrees or higher may be provided. Furthermore, when the tilt angle ($\theta_B$) of the liquid crystal molecule in contact with the supporter is about 45 to 115 degrees and the gamma (γ) value is about 0.01 or more, an up and down viewing angle of about 100 degree or higher may be provided, and when the tilt angle ($\theta_B$) of the liquid crystal molecule contact with the supporter is about 60 to 90 degrees and the gamma (γ) value is about 1 or less, an up and down viewing angle of about 105 degrees or higher may be provided.

Thereby, a desirable viewing angle may be accomplished by controlling the variables of the liquid crystal molecules in the cholesteric liquid crystal layer.

The method of manufacturing the above described optical compensation film will now be described.

First, a cholesteric liquid crystal solution including a polymerizable cholesteric liquid crystal monomer and a chiral dopant is prepared. Each cholesteric liquid crystal monomer and chiral dopant may be included at about 0.01 wt % to about 90 wt % based on the total amount of cholesteric liquid crystal solution.

The cholesteric liquid crystal solution may further include a photo-isomerizing material. The photo-isomerizing material may be selected from methyl orange, a compound having an azo group, a combination thereof or other materials with similar characteristics.

In addition, an ultra-violet absorbing monomer or a polymer thereof may be added to the cholesteric liquid crystal solution to enhance absorption gradient and thereby to give tilt angle gradient in the vertical direction. The ultra-violet absorbing monomer may be, for example, a (meth)acrylate compound such as isobornyl (meth)acrylate, stilbene di(meth)acrylate or other material with similar characteristics.

Then an alignment layer is formed on the supporter 400 and rubbed in a predetermined direction.

The cholesteric liquid crystal solution is then applied to the support formed with the alignment layer by, for example, spin coating or other similar techniques.

The cholesteric liquid crystal solution is irradiated with linearly-polarized light or circularly-polarized light to provide a cholesteric liquid crystal layer having a helical structure with helical axis bent and tilted with respect to the supporter 400.

The helical cholesteric liquid crystal layer is provided to have a helical axis bent and tilted with respect to the supporter at an angle represented by the following Equation 1.

$$H=(\theta_T-\theta_B)*(d'/d)^\gamma+\theta_B \qquad \text{[Equation 1]}$$

In Equation 1, H is the tilt angle of the helical axis of the cholesteric liquid crystal layer; $\theta_B$ is the tilt angle of the liquid crystal molecule in contact with the supporter; $\theta_T$ is the tilt angle of a liquid crystal molecule of the cholesteric liquid crystal layer furthest from the supporter; d is a thickness of the cholesteric liquid crystal; d' is the distance from the support in the vertical direction; and γ≥0.01.

Embodiments include configurations wherein mechanical force may be applied to the cholesteric liquid crystal solution applied on the substrate 400.

Then the tilted cholesteric liquid crystal monomers are photo-polymerized to provide an optical compensation layer.

Hereinafter, the present disclosure is described in more detail with reference to examples. However, they are many embodiments of the present invention, and the present invention is not limited to the ones described herein.

Example 1

Fabricating Optical Compensation Film

In the present embodiment, 94 wt % of a mixed solution of a liquid crystal monomer (in this embodiment, trade name: LC242®, manufactured by BASF) and a chiral dopant (trade name: LC756®, manufactured by BASF), 1 wt % of a polymerization initiator (trade name: Irgacure® 184m, manufactured by CIBA), and 5 wt % of methyl orange are dissolved in toluene to provide an entire solid of 20 wt %, so as to provide a cholesteric liquid crystal solution.

Then the cholesteric liquid crystal solution is spin-coated on a Triacetyl Cellulose ("TAC") substrate coated with a polyimide. The layer is adjusted to have a thickness of about 0.5 μm.

The cholesteric liquid crystal solution is irradiated with circularly-polarized light. The light source of circularly-polarized light may include laser light (such as via an Innova 305®, manufactured by Coherent Co.) having a releasing wavelength of about 550 nm corresponding to the absorbing peak of methyl orange, and the circularly-polarized light is irradiated at an intensity of 100 mW, 200 mW, 300 mW, 400 mW, and 800 mW, respectively. Thereby, the methyl orange molecules positioned at the outermost part of the optical compensation layer furthest from the supporter are arranged in the direction of incidence of polarized light by the photo-isomerization, and the adjacent liquid crystal molecules are arranged according to the arranging direction of methyl orange molecules to provide a cholesteric liquid crystal layer having a tilted helical axis. The gamma (γ) value is changed depending upon the intensity of the circularly-polarized light, and the gamma (γ) value is 0.1, 1, 2, 4, and 8, respectively, according to the light intensity. The gamma value and the tilt angles may be measured using a polarimeter such as an Axoscan® (manufactured by Axometrics) or other similar device.

Thereby, the tilt angle ($\theta_B$) of the liquid crystal molecule 500a in contact with the supporter 400 is adjusted to about 5 degrees, and the tilt angle ($\theta_T$) of the liquid crystal molecules 500a at the outermost part of the optical compensation layer furthest from the supporter, e.g., the part in contact with the air, is adjusted to about 80 degrees. Thereby the tilt angle difference in both ends of the cholesteric liquid crystal layer provides a continuous change of tilt angle in the entire cholesteric liquid crystal layer, so as to spontaneously provide a distinct helical structure with a bent and tilted helical axis.

Subsequently, UV light of about 250 mW is irradiated for one minute to polymerize the liquid crystal monomer and to provide a rigid optical compensation film.

Fabricating the LCD

The optical compensation films are attached to both surfaces of a TN mode LCD panel to provide an LCD.

Example 2

An LCD is fabricated in accordance with the same procedure as in Example 1, except that the cholesteric liquid crystal solution is applied in a thickness of about 1 μm.

Example 3

In the present embodiment t, 99 wt % of a mixed solution of a liquid crystal monomer (trade name: LC242®, manufactured by BASF) and a chiral dopant (trade name: LC756®, manufactured by BASF) and 1 wt % of a polymerization initiator (trade name: Irgacure® 184m, manufactured by CIBA) are dissolved in toluene to provide an entire solid of 20 wt %, so as to provide a cholesteric liquid crystal solution.

Then the cholesteric liquid crystal solution is spin-coated on a TAC substrate coated with a polyimide to provide a pretilt angle of about 5 degrees. In the present embodiment, the layer is adjusted to have a thickness of about 0.5 μm.

In order to control the tilt angle of the liquid crystal molecules positioned at the outermost part of the optical compensation layer furthest from the supporter, e.g., the part in contact with the air, a separate auxiliary substrate is contacted with the cholesteric liquid crystal solution and then a partial shearing process is performed to apply a force thereto and push the liquid crystal solution in a horizontal direction at a constant speed. This may change the gamma (γ) value, which is the degree of variation in tilt angle of helical axis of the liquid crystal molecule contact with the auxiliary substrate and the tilt angle of liquid crystal molecules on the entire film by adjusting the weight of the auxiliary substrate. For example, during the partial shearing process, when a force of about 0.05 N/m², 0.1 N/m², 0.4 N/m², and 0.8 N/m² is applied at a speed of 1 cm/s in an across direction, the gamma (γ) value becomes about 0.1, 1, 2, and 4, respectively. The gamma value is measured using a polarimeter such as an Axoscan® (manufactured by Axometrics) or other similar device.

Thereby, the tilt angle ($\theta_B$) of the liquid crystal molecule 500a in contact with the supporter 400 is adjusted to about 5 degrees, and the tilt angle ($\theta_T$) of the liquid crystal molecules positioned at the outermost part of the optical compensation layer furthest from the supporter, e.g., the part in contact with the air, is adjusted to about 80 degrees. The tilt angle is continuously changed inside the cholesteric liquid crystal layer due to the tilt angles respectively formed at both ends of the cholesteric liquid crystal layer to spontaneously provide a distinct helical structure.

Then UV light of about 250 mW is irradiated for one minute to polymerize the liquid crystal monomer, so as to provide a rigid optical compensation film.

Comparative Example 1

An LCD is fabricated without attaching the optical compensation film.

<Viewing Angle Characteristic-1>

Embodiments of LCDs according to Examples 1 and 2 and Comparative Example 1 are compared with regard to their respective viewing angle characteristics.

Figure 8A:
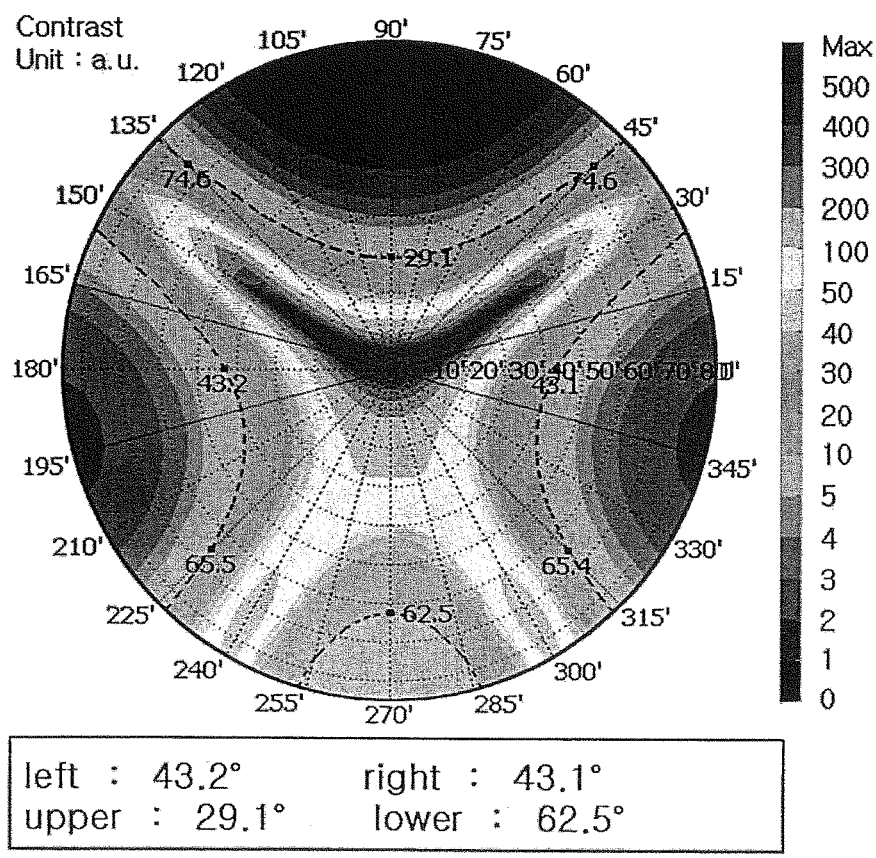
FIG. 8A to FIG. 8C are diagrams showing a viewing angle characteristic of LCDs according to Examples 1 and 2 and Comparative Example 1.
Figure 8B:
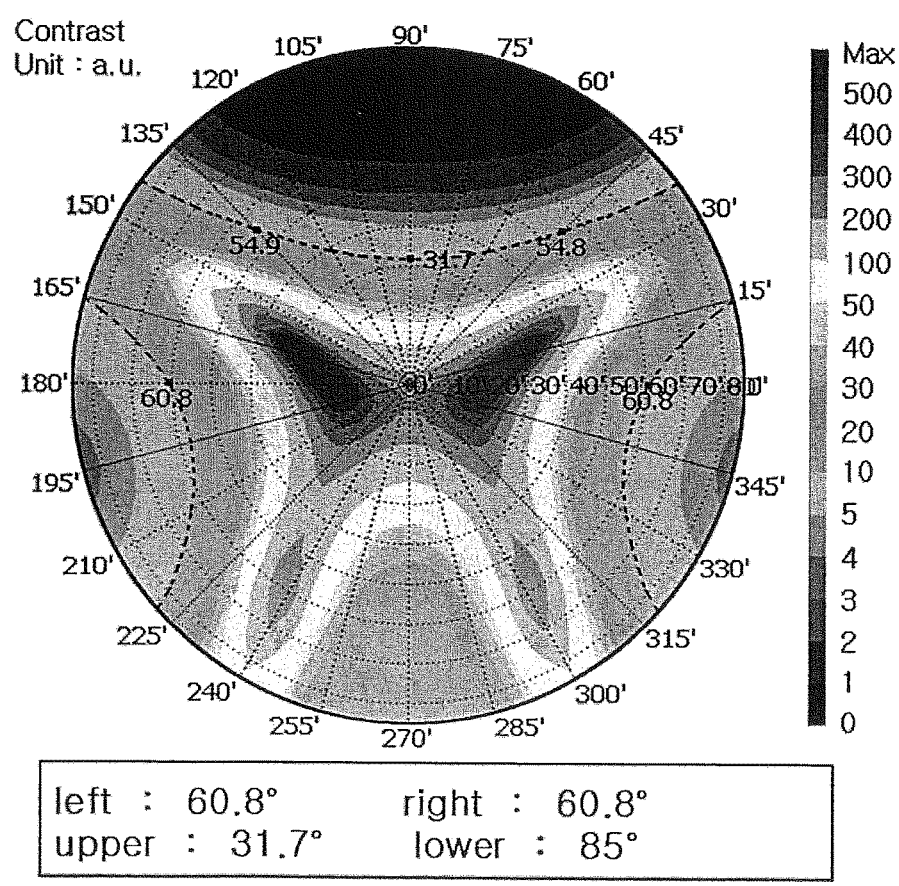
Figure 8C:
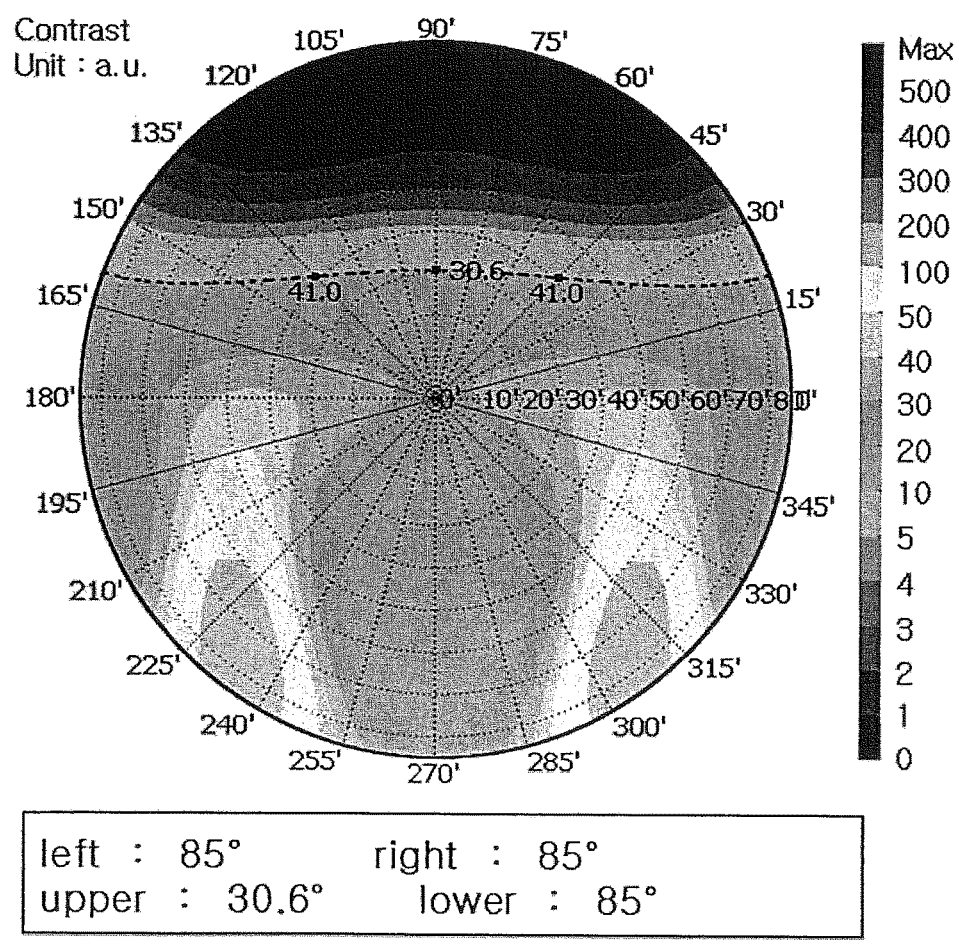

FIG. 8A to FIG. 8C are diagrams showing the viewing angle characteristics of LCDs according to Examples 1 and 2 and Comparative Example 1.

Referring to FIG. 8A to FIG. 8C, the LCD (FIG. 8B) according to Example 1 and the LCD (FIG. 8C) according to Example 2 improve the left and right viewing angle and the up and down viewing angle as compared to the LCD (FIG. 8A) according to Comparative Example 1.

<Viewing Angle Characteristic-2>

Embodiments of LCDs according to Example 3 and Comparative Example 1 are compared for viewing angle characteristic.

Figure 9A:
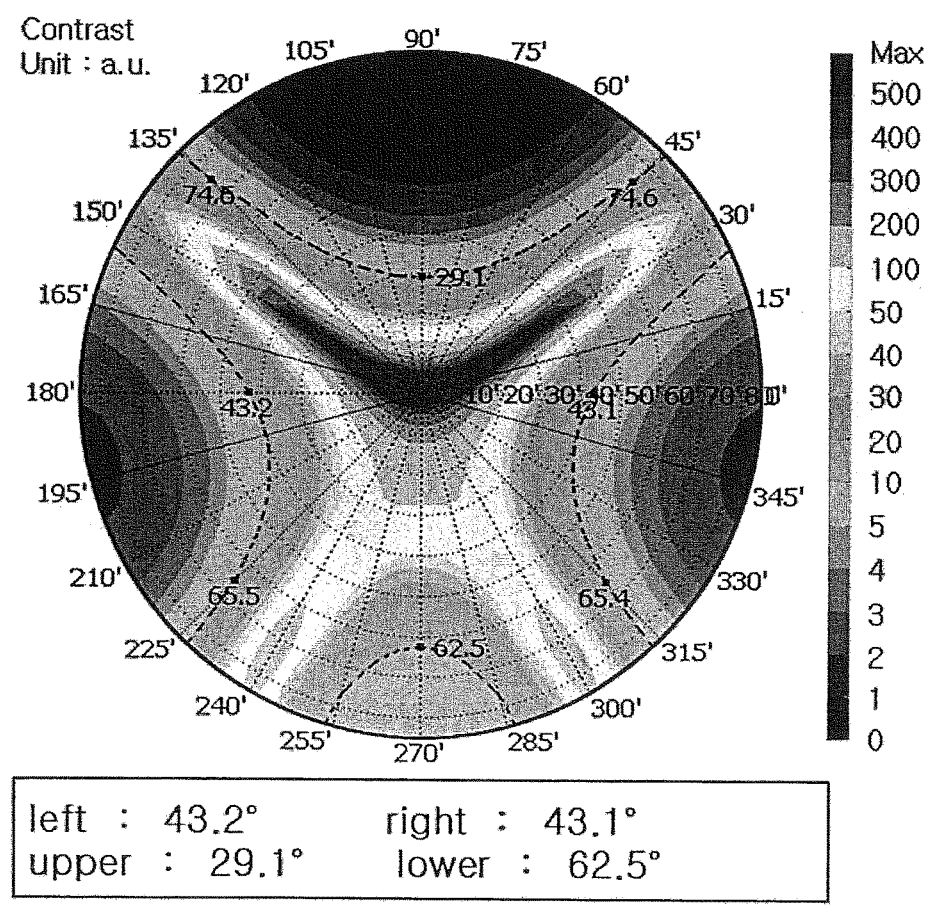
FIG. 9A and FIG. 9B are diagrams showing viewing angle characteristics of LCDs according to Example 3 and Comparative Example 1.
Figure 9B:
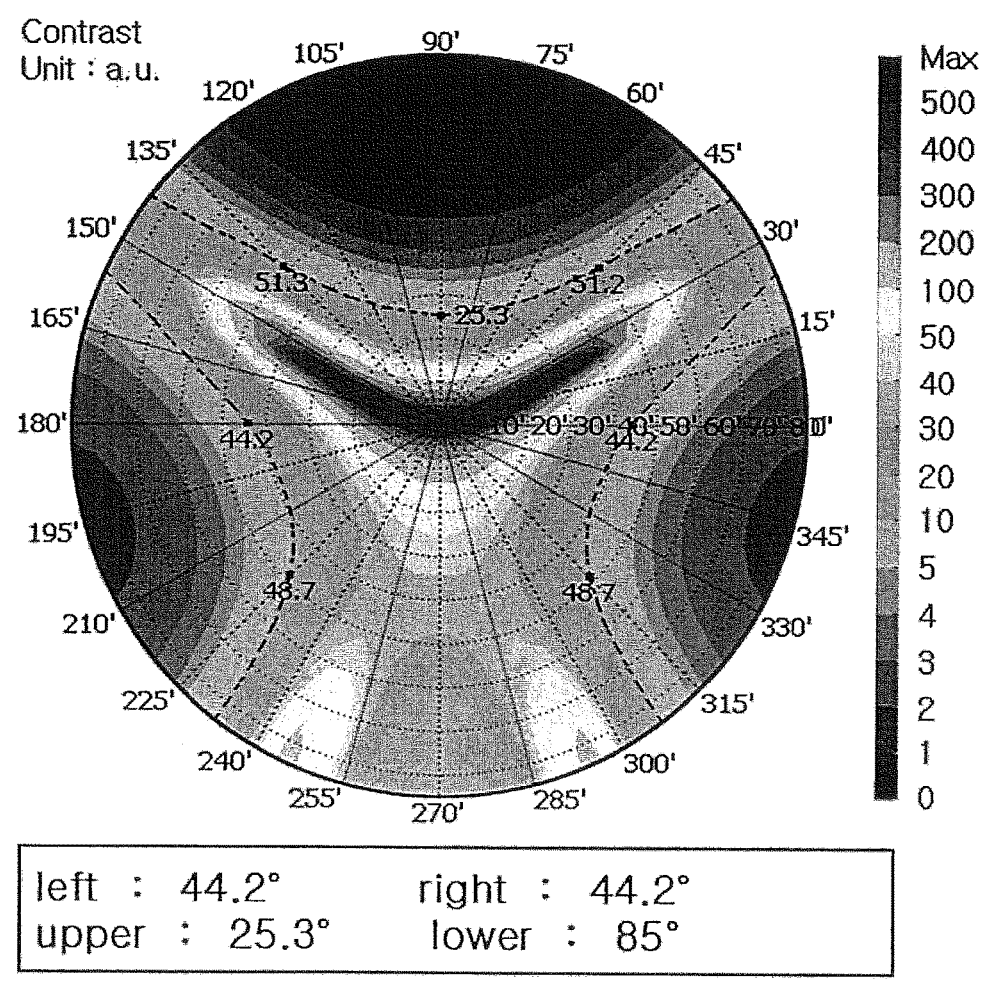

FIG. 9A and FIG. 9B are diagrams showing the viewing angle characteristic of embodiments of LCDs according to Example 3 and Comparative Example 1.

Referring to FIG. 9A and FIG. 9B, the embodiment of an LCD (FIG. 9B) according to Example 3 improves the left and right viewing angle and the up and down viewing angle compared to the LCD (FIG. 9A) according to Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical compensation film comprising:
a supporter; and
an optical compensation layer disposed on at least one surface of the supporter and comprising a polymer of cholesteric liquid crystal molecules having a helical structure, wherein a helical axis of the cholesteric liquid crystal molecules is bent and tilted with respect to the supporter at an angle represented by the following Equation 1:

$$H=(\theta T-\theta B)*(d'/d)\gamma+\theta B \quad \text{[Equation 1]}$$

and wherein a plurality of cholesteric liquid crystalline molecules are arranged in a helical shape to form a segment; wherein each segment comprises the plurality of cholesteric liquid crystalline molecules that undergo one helical rotation; and wherein the cholesteric liquid crystalline molecules have different segments that have different orientations with respect to the supporter; wherein, in Equation 1, H is a tilt angle of the helical axis of a layer of the cholesteric liquid crystal molecules; $\theta B$ is a tilt angle of a cholesteric liquid crystal molecule in contact with the supporter; $\theta T$ is a tilt angle of a cholesteric liquid crystal molecule disposed at a part of the layer furthest from the supporter; wherein $\theta B$ and $\theta T$ are not equal to each other and wherein $\theta B$ and $\theta T$ are both greater than zero; d is a thickness of the layer; d' is a distance from the supporter to a part of the layer along a vertical direction; $\gamma$ is a degree of variation in tilt angle of the helical axis; and $\gamma \geq 0.01$.

2. The optical compensation film of claim 1, wherein $\gamma$ is in the range of about $0.01 \leq \gamma \leq$ about 100.

3. The optical compensation film of claim 2, wherein $\theta T$ is about 80 degrees or less.

4. The optical compensation film of claim 2, wherein $\theta B$ is about 120 degrees or less.

5. The optical compensation film of claim 1, further comprising an alignment layer disposed between the supporter and the optical compensation layer.

6. A liquid crystal display comprising:
a liquid crystal display panel comprising:
a first display panel;
a second display panel; and
a liquid crystal layer interposed between the first display panel and the second display panel; and
an optical compensation film mounted on at least one surface of the liquid crystal display panel,
wherein the optical compensation film comprises:
a supporter, and
an optical compensation layer disposed on at least one surface of the supporter and comprising a polymer of cholesteric liquid crystal molecules having a helical structure,
wherein a helical axis of the cholesteric liquid crystal molecules is bent and tilted with respect to the supporter at an angle represented by the following Equation 1:

$$H=(\theta T-\theta B)*(d'/d)\gamma+\theta B \quad \text{[Equation 1]}$$

and wherein a plurality of cholesteric liquid crystalline molecules having the helical structure form a segment; wherein each segment comprises the plurality of cholesteric liquid crystalline molecules that undergo one helical rotation; and wherein the cholesteric liquid crystalline molecules have different segments that have different orientations with respect to the supporter; wherein, in Equation 1, H is a tilt angle of the helical axis of a layer of the cholesteric liquid crystal molecules; $\theta B$ is a tilt angle of a liquid crystal molecule in contact with the supporter; $\theta T$ is a tilt angle of a liquid crystal molecules disposed at a part of the layer furthest from the supporter; wherein $\theta B$ and $\theta T$ are not equal to each other and wherein $\theta B$ and $\theta T$ are both greater than zero; d is a thickness of the layer; d' is a distance from the supporter to a part of the layer along a vertical direction; $\gamma$ is a degree of variation in tilt angle of the helical axis; and $\gamma \geq 0.01$.

7. The liquid crystal display of claim 6, wherein the $\gamma$ is in the range of about $0.01 \leq \gamma \leq$ about 100.

8. The liquid crystal display of claim 7, wherein $\theta T$ is about 80 degrees or less.

9. The liquid crystal display of claim 7, wherein $\theta B$ is about 120 degrees or less.

10. The liquid crystal display of claim 6, wherein the liquid crystal display panel is a TN mode liquid crystal display panel.

* * * * *